United States Patent
Khandelwal et al.

(10) Patent No.: US 11,113,219 B2
(45) Date of Patent: Sep. 7, 2021

(54) PROTOCOL DATA UNIT END HANDLING WITH FRACTIONAL DATA ALIGNMENT AND ARBITRATION FAIRNESS

(71) Applicant: NXP USA, Inc., Austin, TX (US)

(72) Inventors: Puneet Khandelwal, Noida (IN); Arvind Kaushik, Ghaziabad (IN); Amrit Pal Singh, Ludhiana (IN)

(73) Assignee: NXP USA, Inc., Austin, TX (US)

( * ) Notice: Subject to any disclaimer, the term of this patent is extended or adjusted under 35 U.S.C. 154(b) by 29 days.

(21) Appl. No.: 16/786,190

(22) Filed: Feb. 10, 2020

(65) Prior Publication Data

US 2021/0248098 A1 Aug. 12, 2021

(51) Int. Cl.
| | |
|---|---|
| *G06F 13/364* | (2006.01) |
| *G06F 13/16* | (2006.01) |
| *G06F 11/10* | (2006.01) |
| *G06F 13/40* | (2006.01) |
| *G06F 13/28* | (2006.01) |

(52) U.S. Cl.
CPC ........ *G06F 13/364* (2013.01); *G06F 11/1068* (2013.01); *G06F 13/1605* (2013.01); *G06F 13/28* (2013.01); *G06F 13/4018* (2013.01); *G06F 13/4031* (2013.01)

(58) Field of Classification Search
CPC ............. G06F 11/1068; G06F 13/0656; G06F 13/1605; G06F 13/1668; G06F 13/1678; G06F 13/28; G06F 13/364; G06F 113/4009; G06F 13/4013; G06F 13/4018; G06F 13/4031
See application file for complete search history.

(56) References Cited

U.S. PATENT DOCUMENTS

| | | | |
|---|---|---|---|
| 6,414,609 B1 | 7/2002 | Zukawa et al. | |
| 7,243,172 B2 | 7/2007 | Oner et al. | |
| 8,738,860 B1 | 5/2014 | Griffin et al. | |
| 9,444,769 B1 * | 9/2016 | Eiriksson | H04L 69/324 |
| 2003/0120797 A1 * | 6/2003 | Brodeur | H04L 49/9094 709/236 |
| 2004/0008713 A1 * | 1/2004 | Knight | G06F 13/28 370/428 |
| 2004/0037313 A1 * | 2/2004 | Gulati | H04L 12/56 370/465 |
| 2005/0141503 A1 * | 6/2005 | Welfeld | H04L 45/60 370/392 |

(Continued)

*Primary Examiner* — Thomas J. Cleary

(57) ABSTRACT

In at least one embodiment, a method for handling data units in a multi-user system includes granting a shared resource to a user of a plurality of users for a transaction associated with an entry of a transaction data structure. The method includes determining whether the transaction stored last partial data of a data unit associated with the user in an alignment register associated with the user. The method includes asserting a request for arbitration of a plurality of transactions associated with the plurality of users. The request is asserted for an additional transaction associated with the entry in response to determining that the transaction stored the last partial data in the alignment register. The method may include flushing the last partial data from the alignment register to a target memory in response to detecting an additional grant of the shared resource to the user for the additional transaction.

20 Claims, 5 Drawing Sheets

(56) References Cited

U.S. PATENT DOCUMENTS

| | | | | |
|---|---|---|---|---|
| 2006/0095611 A1* | 5/2006 | Winchester | ............ | G06F 13/28 |
| | | | | 710/52 |
| 2008/0049774 A1* | 2/2008 | Swenson | ............ | H04L 45/7457 |
| | | | | 370/412 |
| 2015/0109024 A1* | 4/2015 | Abdelfattah | ............ | G06F 30/34 |
| | | | | 326/41 |

* cited by examiner

PROTOCOL DATA UNIT END HANDLING WITH FRACTIONAL DATA ALIGNMENT AND ARBITRATION FAIRNESS

BACKGROUND

Field of the Invention

This invention relates to data communications systems, and more particularly, to multi-user data communications systems.

Description of the Related Art

In general, networking standards that support multiple frequency bands and multiple users that share a data communications device (e.g., access point compliant with Institute of Electrical and Electronics Engineers (IEEE) Standard 802.11ac or 802.11ad) are concerned with sharing resources of the digital communications device to provide target performance and quality of service. Users consume system bandwidth proportionate to the bandwidth and data rate for a user while providing fair and efficient usage of those system resources. Referring to FIG. 1, in an exemplary data communications device, processor 109 configures direct memory access logic 102 for a target number of users and with target data specifications for each user. Direct memory access logic 102 fetches data for all users according to a fairness algorithm from an interface (e.g., physical interface 101). Direct memory access logic 102 transfers protocol-defined data units (i.e., PDUs) from physical interface 101 to source memory 104. The width of the PDUs may not match or align with (i.e., may not equal or be an integral multiple of) the width of memory (e.g., the width of an addressable unit for an access of source memory 104, target memory 108 or memory bus 107). A single PDU may be partitioned into multiple buffers in system memory and each of those buffers is represented by a separate descriptor. The descriptor data buffer size may not match or align with the width of the memory. PDU alignment and arbiter circuit 106 arbitrate transactions (e.g., memory access) that read partial data units from source memory 104 and align and merge those partial data units, e.g., using an alignment register for each user or channel, before transferring a partial data unit to a target memory 108 for use by processor 109, which may be a multi-user threshold-based real time processing unit (e.g., a security engine).

Protocol-defined data units may have widths as small as a few bytes and may have fractional data alignment (i.e., the PDU width is a non-integral multiple of the width of a target memory). Each time a PDU ends for a user, PDU alignment and arbiter circuit 106 flushes any fractional partial data (i.e., a partial data unit with a width less than the width of a memory access) remaining in the alignment register for that user. As a result, the $N^{th}$ read transaction of entries for a PDU stored in a source memory may result in an additional write to a target memory as an $(N+1)^{th}$ transaction. If a PDU has fractional data alignment and arbiter circuit 106 halts the arbitration process whenever the system needs to flush last partial data bytes for a user from the corresponding alignment register to the target memory. A conventional arbitration state machine introduces dummy cycles to balance a pipeline of memory transactions. Halting arbitration is detrimental to achieving a target quality-of-service (QoS) and results in unfair allocation of bandwidth between users. The additional write can starve another higher priority user, resulting in unfairness of bandwidth allocation between users. Moreover, for the same user, when target memory 108 has only N locations available to be written, postponing writes of all N+1 locations until the additional (+1) location is available degrades system performance. The above exceptions to handle the additional write degrades performance. Accordingly, improved techniques for handling data units to a target memory are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

Figure 1:
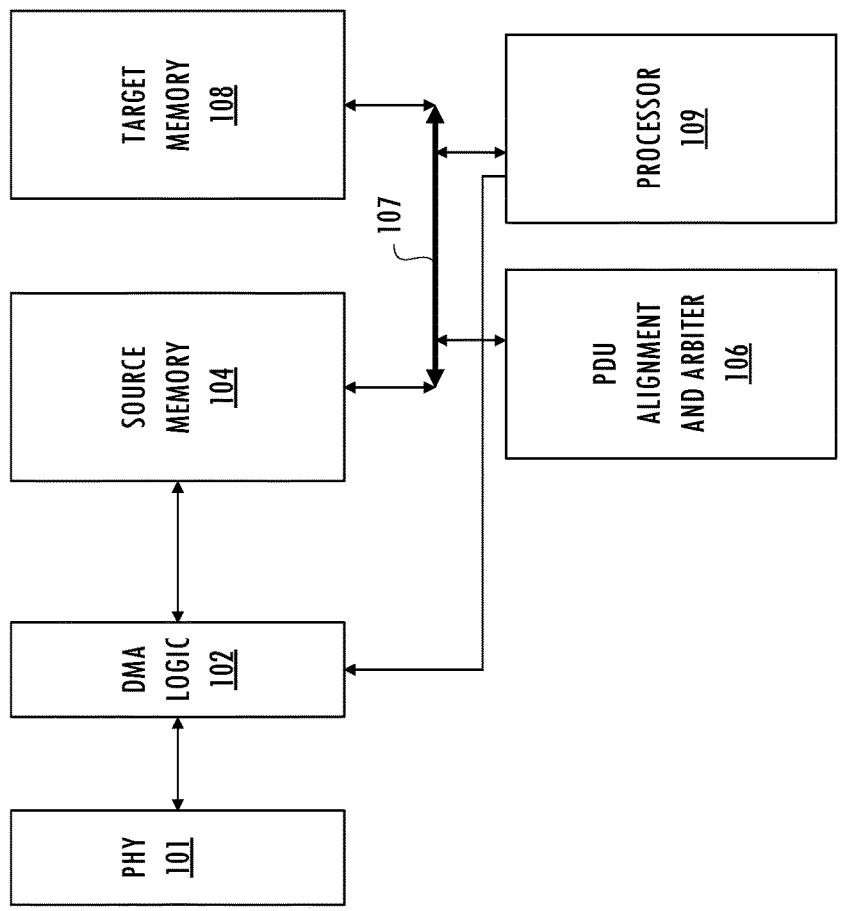
FIG. 1 illustrates a functional block diagram of an exemplary data communications system including a conventional data unit alignment and arbiter.
Figure 2:
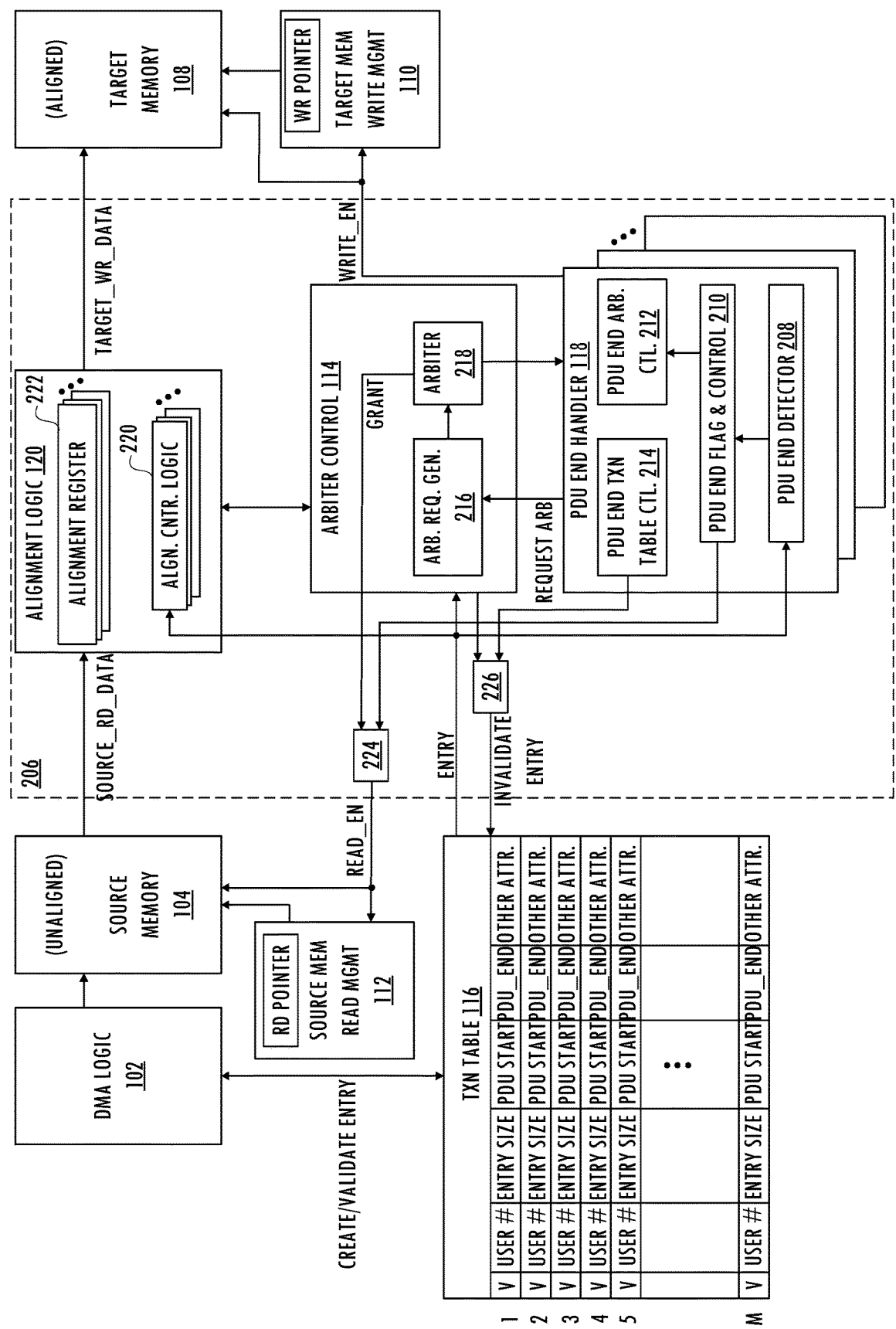
FIG. 2 illustrates a functional block diagram of an exemplary data communications system including a data unit handler consistent with at least one embodiment of the invention.

A communications device applicable to a multi-user or multi-channel data communications system includes a data unit handler that handles fractional data alignment without disrupting arbitration fairness. The data unit handler does not generate exceptions at the end of a transfer of a data unit (e.g., integral data units or fractional data units) from an unaligned memory to an aligned memory. Every access of a shared resource (e.g., read from an unaligned source memory or write to an aligned target memory) is governed by arbitration. Referring to FIG. 2, a multi-user data communications device includes PDU handler 206 that handles last partial data of a PDU without interrupting arbitration to maintain performance and QoS. PDU handler 206 includes a PDU end handler circuit 118 for each user (e.g., receiver channel), which generates control signals that are used to flush last partial data of a PDU from an alignment register for that user without interrupting transaction processing.

In at least one embodiment, each PDU end handler circuit 118 includes an instantiation of PDU end detector 208, PDU end flag and control circuit 210, PDU end arbiter control circuit 212, and PDU end transaction table control circuit 214. PDU end detector 208 detects an end of a PDU based on an PDU end attribute in an entry of transaction table 116 corresponding to a winning transaction (i.e., a transaction identified by arbiter control 114 as being granted access to memory according to a fairness algorithm). PDU end flag and control circuit 210 sets and resets a PDU end flag for the corresponding user based on the PDU end attribute in an entry of transaction table 116 corresponding to a winning transaction and a current status of the PDU end flag. In at least one embodiment, PDU end arbiter control circuit 212 asserts a request for arbitration based on the status of the PDU end flag for the corresponding user. PDU end transaction table control circuit 214 generates a control signal used by control logic 226 that invalidates a last entry of the corresponding user in transaction table 116 in response to flushing last partial data (e.g., fractional partial data) of the PDU from the corresponding alignment register and writing the last partial data to target memory 108.

Source memory read management 112 controls the read of source memory 104 to SOURCE_RD_DATA bus and prevents a next read of source memory 104 during an additional transaction (e.g., an N+1$^{th}$ transaction) associated with flushing last partial data of a PDU from an alignment register to target memory 108. In an embodiment, source memory read management 112 receives a read control signal from PDU handler 206 that is used as a read enable signal for source memory 104 and controls updates of a read pointer signal. The read control signal is set by control logic 224 in response to a grant to memory of a transaction and the PDU end flag for a user corresponding to the transaction. Target memory write management 110 controls the writes of target memory 108 with data on the TARGET_WR_DATA bus and control signal WRITE_EN generated by PDU handler 206. Transaction table 116 receives an invalidation signal for an entry corresponding to a winning transaction to disable further arbitration requests for that transaction.

In an embodiment, DMA logic 102 writes PDUs for each user to source memory 104 and associated metadata to transaction table 116 for one or more corresponding transactions. In an embodiment, the metadata includes a valid bit, an identifier of the user associated with the transaction, entry size (e.g., width in bytes), indicator of whether the entry is a start of the PDU, and an indicator of whether the entry is an end of the PDU. Other attributes may be included. Transaction table 116 can include entries for multiple users where each user has only one open PDU at a time. However, the open PDU can have multiple entries in transaction table 116. An entry in transaction table 116 may generate variable-sized read transactions from physical interface 101 to source memory 104 depending on entry size. Arbiter request generator 216 uses the valid bit of a transaction to detect valid transactions for generation of arbitration requests for access to a shared resource. Arbiter 218 grants a user associated with a winning transaction access to the shared resource based on the metadata in transaction table 116 and alignment logic 120 for that user. Arbiter 218 implements any suitable fairness algorithm to select the winning transaction. Alignment logic 120 includes an alignment register 222 for each user and associated control logic including an alignment counter 220 to align and merge partial data units of different transactions. A merged and aligned partial data unit is transfer to target memory 108 using TARGET_WR_DATA in response to a grant of memory access to a transaction, as described further below.

PDU end handler 118 determines whether a winning transaction is associated with an end of the PDU by determining whether the PDU_END attribute of an entry of transaction table 116 corresponding to the winning transaction is set. If the winning transaction is associated with an end of the PDU, PDU end handler 118 determines whether the winning transaction needs an additional write to target memory 108 due to last partial data remaining in the corresponding alignment register 222 (e.g., if the sum of the width of merged data of the alignment register and data on the SOURCE_RD_DATA bus has a width that exceeds the width of target memory 108).

If the winning transaction is associated with an end of the PDU, PDU end handler 118 sets the PDU end flag for the corresponding user. PDU handler 206 does not invalidate the associated entry in transaction table 116 if the PDU end flag for the corresponding user is set. As a result, the transaction stays valid for an additional arbitration grant of that transaction. PDU end handler 118 requests a second arbitration for the user based on the same transaction. If a transaction receives a grant of memory access by a winning transaction while the PDU end flag for the associated user is set, target memory 108 is written with whatever partial data (e.g., fractional partial data) is stored in the alignment register for that user. However, if the transaction receives a grant of memory access while the PDU end flag is set, source memory read management 112 does not update the read pointer and source memory 104 is not read. Preventing a next read access of source memory 104 in this way does not impact the arbitration pipeline and does not increase complexity of the target memory write process.

After PDU end handler 118 writes the last partial data to target memory 108, the PDU end flag is in a reset state and the corresponding entry in transaction table 116 is invalid (e.g., the V bit of the corresponding table entry is in a reset state). Thus, every write to target memory 108 is governed by arbitration and no exceptions to arbitration occur.

Figure 3:
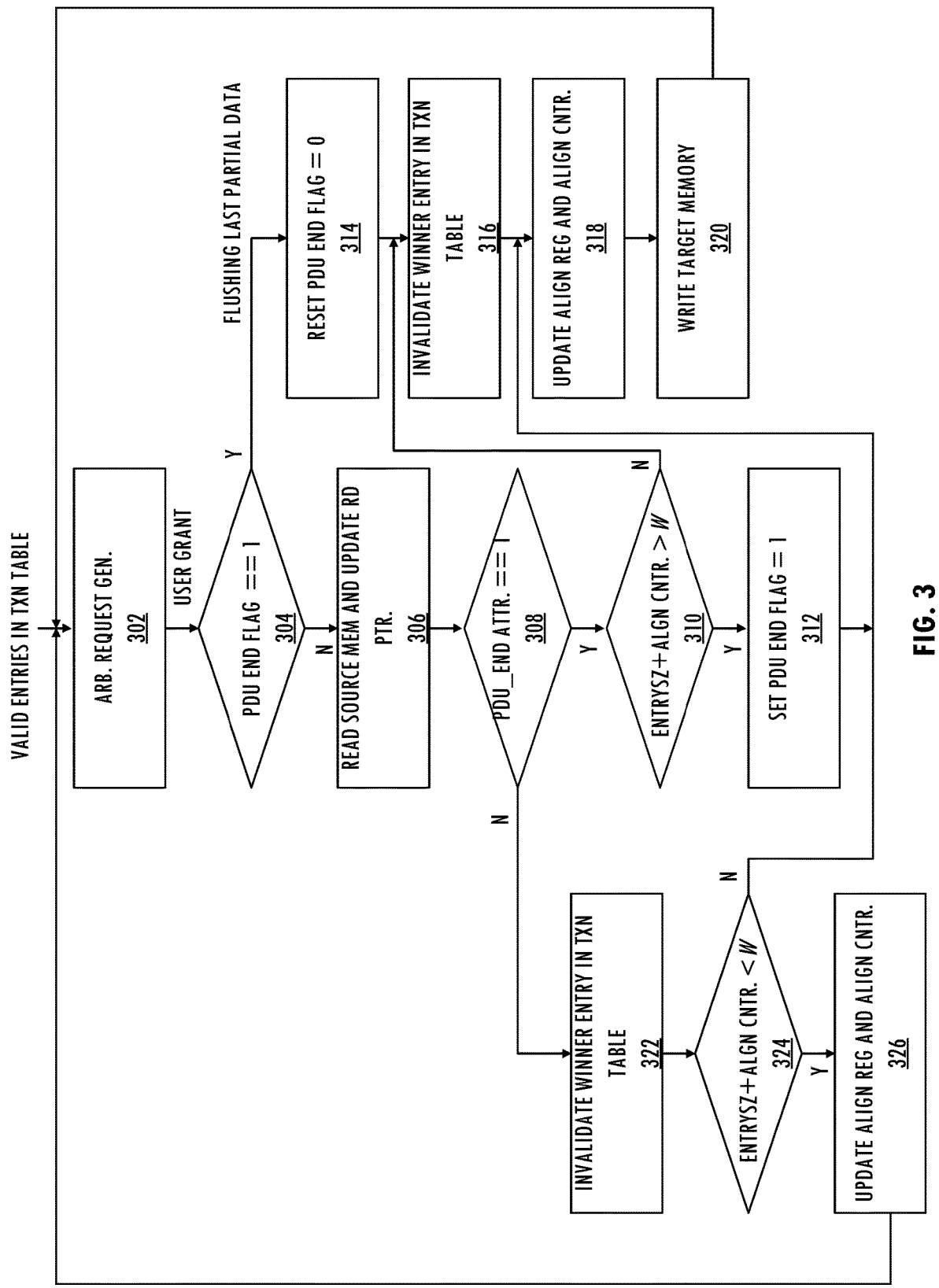
FIG. 3 illustrates an information and control flow for handling data units where an entry size is always less than or equal to a word size of a target memory consistent with at least one embodiment of the invention.

Referring to FIGS. 2 and 3, in an exemplary embodiment, the size of partial data unit entries stored in source memory 104 (i.e., entry size, e.g., width in bytes) is always less than or equal to width W of target memory 108. Arbiter request generator 216 generates an arbitration request for each user associated with a valid entry in transaction table 116 (302). Arbiter 218 identifies a winning transaction based on a fairness algorithm. If the PDU end flag 210 is set for the user associated with the winning transaction (304), then PDU handler 206 flushes last partial data (e.g., a fractional partial data) in an alignment register 222 that corresponds to the user of the winning transaction. Flushing the last partial data includes resetting the PDU end flag 210 for the user (314), invalidating the entry in transaction table 116 corresponding to the winning transaction (316), updating the alignment register 222 and an associated alignment counter 220 that correspond to the user of the winning transaction (e.g., clearing alignment register 222 and clearing alignment counter 220) (318), and writing the last partial data to the target memory 108 (320).

If the PDU end flag 210 for the user associated with the winning transaction is in a reset state (304), then PDU handler 206 enables a read of a next entry of source memory 104 and updates the associated read pointer accordingly (306). If the PDU_END attribute in an entry of transaction table 116 corresponding to a winning transaction is set (308), then the winning transaction is associated with the end of a PDU for the corresponding user. If the PDU has fractional data alignment, then the Nth transaction associated with the PDU may need an additional transaction to write last partial data (e.g., fractional partial data) to target memory 108. PDU handler 206 determines whether that winning transaction, which is associated with the end of the PDU for the user, requires an additional transaction to write to target memory 108 by determining whether a condition precedent to triggering an additional write to the target memory is true based on a first width of data of the entry, a second width of partial data stored in the alignment register, and a third width of the target memory, e.g., by determining whether the sum of the width of the current contents of the alignment register and the width of the memory entry associated with the winning transaction exceeds width W of target memory 108 (310). If the condition precedent to triggering an additional write to the target memory is false based on a first width of data of the entry, a second width of partial data stored in the alignment register, and a third width of the target memory, i.e., an additional write to target memory 108 is not needed by the transaction associated with the end of the PDU (310), then PDU handler 206 invalidates the entry in transaction table 116 for the winning transaction (316), updates the alignment register 222 that corresponds to the user of the winning transaction and an associated alignment counter 220 (e.g., resets alignment register 222 and resets alignment counter 220) (318), and writes the last partial data of the PDU to target memory 108 (320).

If the condition precedent to triggering an additional write to the target memory is true based on a first width of data of the entry, a second width of partial data stored in the alignment register, and a third width of the target memory, i.e., the additional write to target memory 108 is needed by the transaction associated with the end of the PDU (310), then PDU end handler 118 sets the PDU end flag 210 for the user (312), updates the alignment register 222 that corresponds to the user of the winning transaction (e.g., with fractional partial data) and updates an associated alignment counter 220 (e.g., sets alignment counter 220 to indicate the width of the last partial data in alignment register 222) (318), and writes penultimate partial data of the PDU to target memory 108 (320). PDU end handler 118 requests another arbitration based on the winning transaction.

If the PDU_END attribute in the entry of transaction table 116 corresponding to the winning transaction is in a reset state (308), then the winning transaction is not associated with the end of a PDU for the corresponding user. PDU handler 206 invalidates the entry in transaction table 116 for the winning transaction (322). PDU handler 206 determines whether a condition precedent to a write to target memory 108 is true based on a first width of data entry, a second width of partial data stored in the alignment register, and a third width of the target memory, e.g., determines whether the contents of the user alignment register 222 merged with the entry of source memory 104 associated with the winning transaction form partial data that is a fraction of the width of the target memory 108 (e.g., by determining whether the sum of the current contents of the alignment register and the width of the memory entry associated with the winning transaction is less than width W of target memory 108) (324). If the contents of the user alignment register 222 merged with the entry of source memory 104 associated with the winning transaction form partial data that is a fraction of the width of the target memory 108 (324), then a write to target memory 108 is not needed, PDU handler 206 stores those fragments of the PDU in the alignment register 222 associated with the user for merger with a fragment from a next winning transaction for the user, updates the alignment counter 220 for the user, and does not enable a write to target memory 108 (326).

If PDU handler 206 determines that merger of the contents of the user alignment register 222 with the entry of source memory 104 associated with the winning transaction form partial data that is at least the width of the target memory 108 (324), then a write to target memory 108 is needed, PDU handler 206 updates alignment register 222 and alignment counter 220 to store a fragment of the entry of the winning transaction and a corresponding width (318), and writes partial data having the same width as target memory 108 to target memory 108 (320). Note that the information and control flow of FIG. 3 is exemplary only and other information and control flows using different sequences of steps that do not affect data dependencies may be implemented by other embodiments of PDU handler 206.

If the PDU has fractional data alignment, then the transaction associated with the end of the PDU (i.e., a transaction having a set PDU end attribute) may need N+1 transactions to transfer last partial data to target memory 108. PDU handler 206 determines whether that transaction, which is associated with the end of the PDU for the user, requires the additional transaction to write last partial data to target memory 108 (e.g., by determining whether the sum of the width of current contents of the alignment register 222 and the width of the partial data read from source memory 104 associated with the transaction, as indicated by ENTRY SIZE attribute of the corresponding entry in transaction table 116, exceeds width W of target memory 108 (310)).

Figure 4:
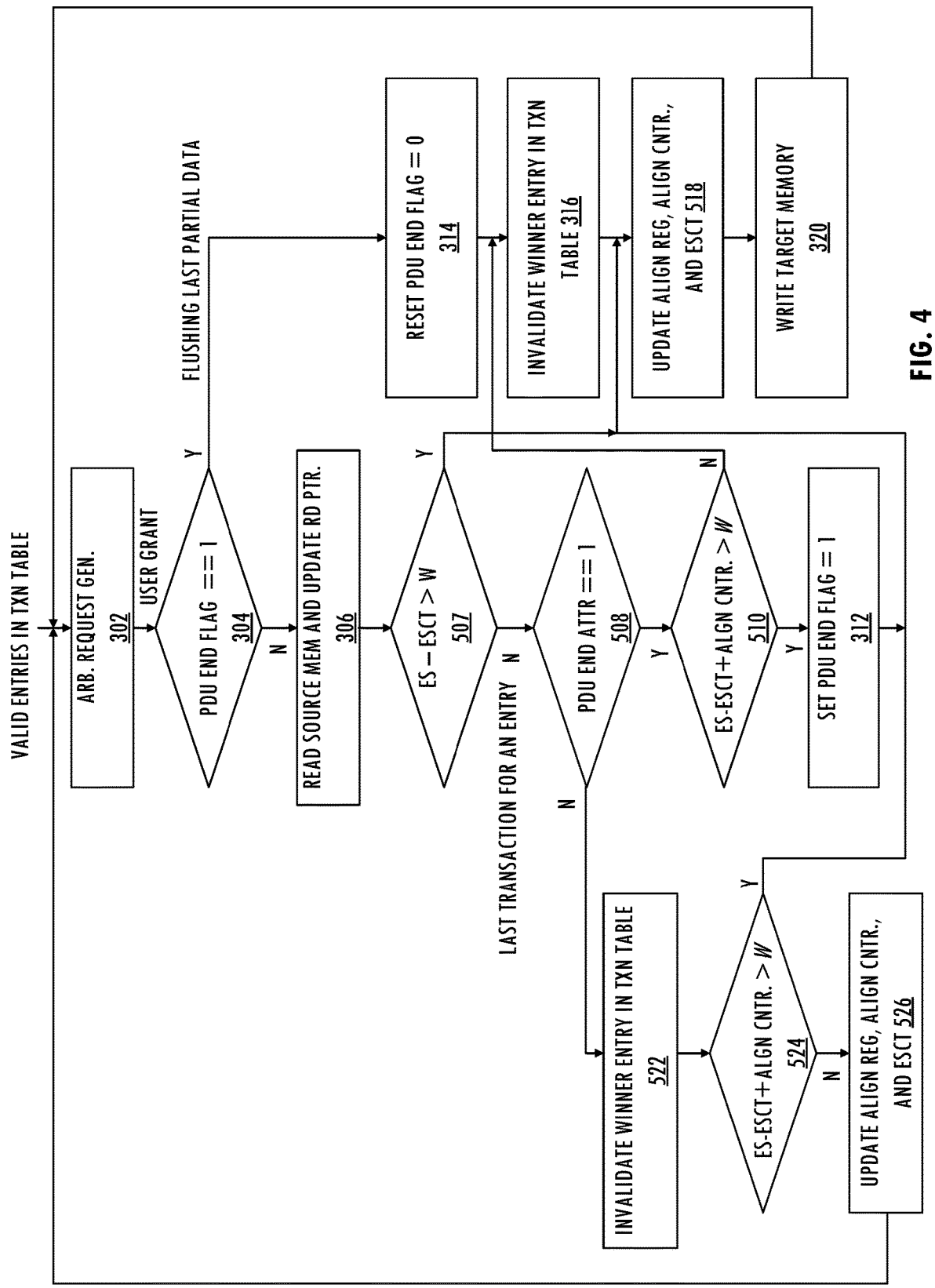
FIG. 4 illustrates an information and control flow for handling data units where an entry size can be greater than a word size of a target memory consistent with at least one embodiment of the invention.

FIG. 3 is exemplary only and describes embodiments where the entry size (e.g., in bytes) is always less than or equal to width W of target memory 108. In other embodiments, the entry size can be greater than width W of target memory 108. Referring to FIGS. 2 and 4, in embodiments where the entry size (ES) can be greater than width W of target memory 108, control logic 226 maintains an entry size counter (ESCT) per entry of transaction table 116. PDU handler 206 increases that counter by width W after an initial grant because W bytes are read from source memory 104 in response to the transaction (e.g., during updates of 518). PDU handler 206 uses the updated value of the entry size counter in a next granted transaction for the entry of transaction table 116. However, control logic 226 does not invalidate the entry in response to the initial read transaction alone. Rather, when the transaction receives a grant of memory access and the difference between the entry size counter corresponding to the entry and the entry size is less than or equal to width W (507), then the winning transaction corresponds to the last transaction for that entry of transaction table 116. PDU handler 206 increases the entry size counter by width W in response to each grant of a transaction until the grant of the last transaction corresponding to the entry of transaction table 116. Control logic 226 invalidates that entry of transaction table 116 only after the entire entry has been read (as per entry size) from source memory 104 and resets the corresponding entry size counter to zero for the invalidated entry.

The modified information and control flow for embodiments allowing the entry size to be greater than width W of target memory 108 includes an additional condition precedent that determines whether the winning transaction is the last transaction corresponding to that entry of transaction table 116 (507) to condition 508. If the winning transaction is not for the last transaction corresponding to that entry of transaction table 116 (e.g., the difference between the entry size and the entry size counter is greater than W) (507), then more than one transaction is needed to complete the data transfer associated with the entry in transaction table 116. Accordingly, PDU handler 206 bypasses determining whether to set PDU END FLAG, bypasses determining whether to invalidate the entry in the transaction table, and PDU handler 206 updates the alignment register, alignment counter, and entry size counter (518) and writes partial data having the same width as target memory 108 to target memory 108 (320). That is PDU handler 206 bypasses invalidation of the entry if more than one transaction is needed to complete the data transfer associated with the entry in the transaction table.

If the winning transaction is for the last transaction corresponding to that entry of transaction table 116 (e.g., the difference between the entry size and the entry size counter is less than or equal to W) (507), then no additional transactions are needed to complete the data transfer associated with the entry in transaction table 116. PDU handler 206 determines whether the winning transaction is associated with the end of a PDU for the corresponding user (e.g., whether the PDU_END attribute of the entry is set) (508). If the winning transaction is associated with the end of a PDU for the corresponding user (508), then PDU handler 206 determines whether that winning transaction, which is associated with the end of the PDU for the user, requires an additional transaction to write to target memory 108 by determining whether a condition precedent based on entry size, entry size counter, a width of partial data stored in the alignment register, and width W of the target memory 108 (e.g., determines whether ES-ESCT+ALGN CNTR.>W) (510).

If the condition precedent to triggering an additional write to the target memory (510) is false, (i.e., an additional write to target memory 108 is not needed by the transaction associated with the end of the PDU), then PDU handler 206 invalidates the entry in transaction table 116 for the winning transaction (316), updates the alignment register 222 that corresponds to the user of the winning transaction, updates an associated alignment counter 220 (e.g., resets alignment register 222 and resets alignment counter 220), and updates the entry size counter (518), and then writes the last partial data of the PDU to target memory 108 (320). If the condition precedent to triggering an additional write to the target memory (510) is true, i.e., an additional write to target memory 108 is needed by the transaction associated with the end of the PDU (510), then PDU end handler 118 sets the PDU end flag 210 for the user (312), updates the alignment register 222 that corresponds to the user of the winning transaction (e.g., with fractional partial data), updates an associated alignment counter 220 (e.g., sets alignment counter 220 to indicate the width of the last partial data in alignment register 222), and updates the entry size counter (518), and then writes penultimate partial data of the PDU to target memory 108 (320). PDU end handler 118 requests another arbitration based on the winning transaction.

If the PDU_END attribute in an entry of transaction table 116 corresponding to the winning transaction is in a reset state (508), then the winning transaction is not associated with the end of a PDU for the corresponding user. PDU handler 206 invalidates the entry in transaction table 116 for the winning transaction (522). PDU handler 206 determines whether a condition precedent to a write to target memory 108 is true based on entry size, entry size counter, a width of partial data stored in the alignment register, and width W of the target memory 108 (e.g., ES-ESCT+ALGN CNTR.>W) (524). If a write to target memory 108 is not needed (524), then PDU handler 206 stores those fragments of the PDU in the alignment register 222 associated with the user for merger with a fragment from a next winning transaction for the user, updates the alignment counter 220 for the user, updates the entry size counter, and without enabling a write to target memory 108 (526). If a write to target memory 108 is needed (524), PDU handler 206 updates the alignment register 222 that corresponds to the user of the winning transaction (e.g., with fractional partial data), an associated alignment counter 220 (e.g., sets alignment counter 220 to indicate the width of the last partial data in alignment register 222), and the entry size counter (518), and then enables a write to target memory 108 (320).

Figure 5:
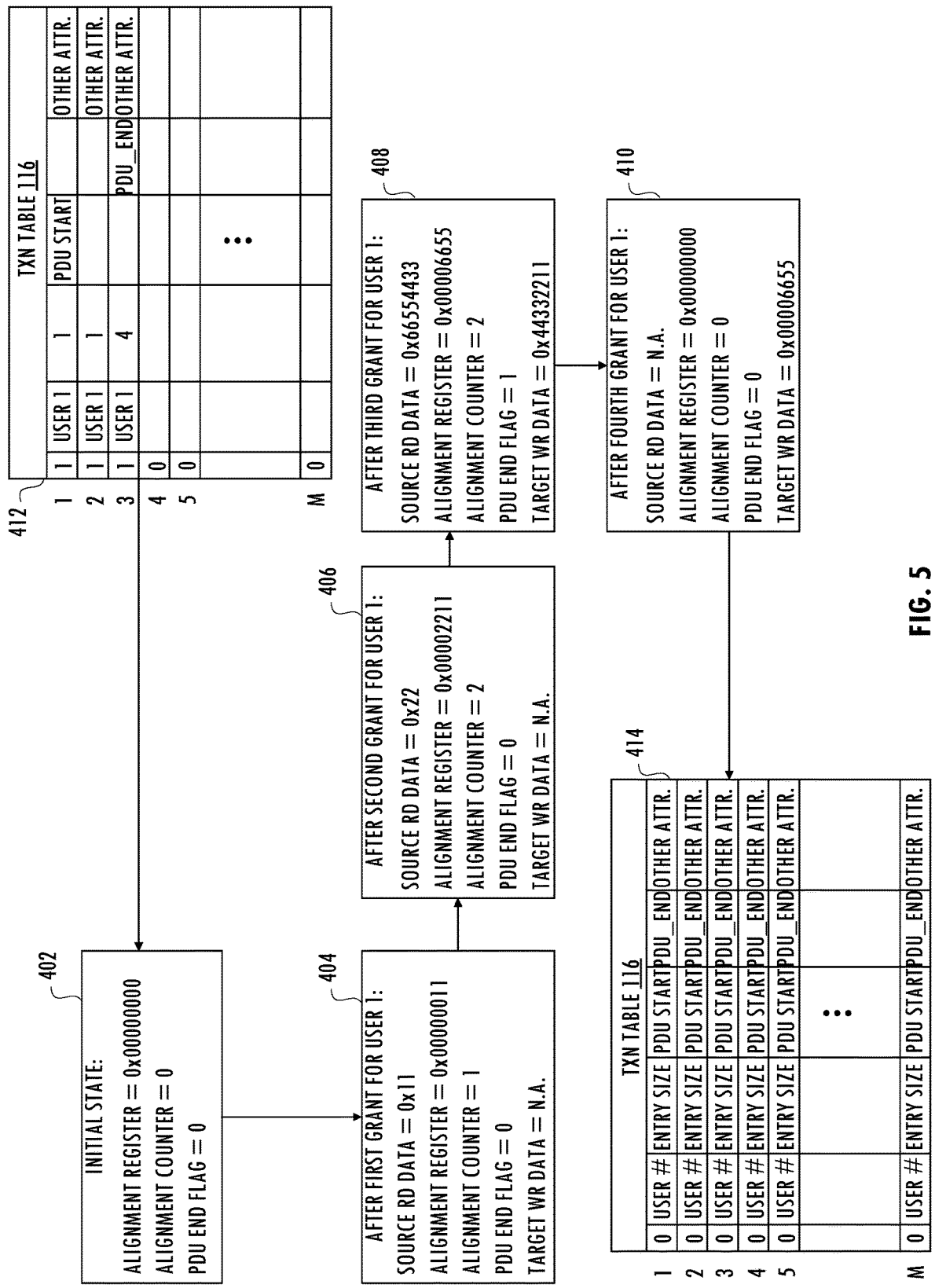
FIG. 5 illustrates state information for transactions executed consistent with at least one embodiment of the invention.

FIGS. 2 and 5 illustrate a simplified example of merging and aligning PDU data by PDU handler 206 for a target memory having width W of 4 bytes. In initial state 412 of transaction table 116, transaction table 116 stores entries for three valid transactions corresponding to user 1. Entry 1 corresponds to a fragment of a PDU for user 1 at the beginning of the PDU and having a width of one byte. Entry 2 corresponds to a fragment of the PDU for user 1 having a width of one byte. Entry 3 corresponds to a last fragment of the PDU for user 1 having a width of four bytes. Since transaction table 116 includes only transactions for user 1, arbitration is not necessary, although in other embodiments, transaction table 116 includes transactions for other users that may be interleaved with the entries for user 1 and arbitration is used to grant memory access to transactions for multiple users according to a fairness algorithm.

In PDU handler initial state 402, the alignment register 222 for user 1 and the corresponding alignment counter 220, and the PDU end flag 210 for user 1 are in a reset state. PDU handler state 404 reflects the updated state after the grant memory access to the transaction associated with entry 1 in transaction table 412. Source memory 104 transfers one byte of data (e.g., 0x11) to PDU handler 206 via the SOURCE_RD_DATA bus. PDU handler 206 stores that data in the least-significant byte of alignment register 222 for user 1 and updates the corresponding alignment counter 220 for user 1 to indicate that one byte is stored in the alignment register 222. Since entry 1 does not correspond to an end of the PDU, PDU end flag for user 1 is in a reset state. Since the contents of the alignment register 222 and the data received via the SOURCE_RD_DATA bus has a width of one byte, which is less than the width of target memory 108, PDU handler 206 does not write to target memory 108 and stores the data associated with the transaction is stored in the alignment register 222. Meanwhile, PDU handler 206 invalidates entry 1 of transaction table 116.

PDU handler state 406 reflects the updated state of PDU handler 206 after handling a winning transaction associated with entry 2 in transaction table 116. Source memory 104 transfers one byte of data (e.g., 0x22) to PDU handler 206 via the SOURCE_RD_DATA bus. PDU handler 206 merges that data with data previously stored in the alignment register 222 for user 1 and updates the corresponding alignment counter 220 to indicate that two bytes are stored in the alignment register 222 for user 1. Since entry 2 does not correspond to an end of the PDU for user 1, PDU end flag for user 1 remains in a reset state. Since the sum of the width of prior-stored contents of the alignment register 222 for user 1 merged with the data associated with entry 2 has a width of two bytes, which is less than the width of target memory 108, PDU handler 206 does not write target memory 108 and stores the data read from source memory 104 associated with the transaction in the alignment register 222 for user 1, merged with prior stored data. Meanwhile, PDU handler 206 invalidates entry 2 of transaction table 412.

PDU handler state 408 reflects the updated state of PDU handler 206 after handling a winning transaction associated with entry 3 in transaction table 116. Source memory 104 transfers four bytes of data (e.g., 0x66554433) to PDU handler 206 via the SOURCE_RD_DATA bus. PDU handler 206 merges that data with data previously stored in the alignment register 222 for user 1. Since the prior-stored contents of the alignment register 222 for user 1 and the data associated with entry 3 has a width of six bytes, which is greater than the width of target memory 108, PDU handler 206 writes a portion of the merged data having the same width as target memory 108 (e.g., penultimate partial data 0x44332211) to target memory 108 via TARGET_WR_ DATA bus. PDU handler 206 stores a remaining portion of the merged data (e.g., last partial data 0x6655) in the alignment register 222 for user 1 and updates the alignment counter 220 for user 1 to reflect that two bytes of data are stored in the alignment register 222 for user 1. Since entry 3 corresponds to an end of the PDU for user 1, PDU handler 206 sets PDU end flag for user 1 to indicate that the third (Nth) transaction needs an additional transaction (N+1) granted memory access to flush last partial data from the alignment register 222 for user 1 to target memory 108. PDU handler 206 does not invalidate entry 3 of transaction table 116.

PDU handler logic state 410 reflects the updated state of PDU handler 206 after handling the fourth (N+1) granted transaction for user 1 in response to the PDU end flag for user 1 being set. PDU handler 206 does not enable a read of source memory 104 or an update of the read pointer, and data on the SOURCE_RD_DATA bus is a don't-care condition. The contents of alignment register 222 for user 1 and the alignment counter 220 for user 1 are in a reset state after the data is transferred from the alignment register 222 for user 1 to the TARGET_WR_DATA bus for a write to target memory 108. PDU handler 206 resets the PDU end flag and enables a write of the last partial data of the PDU for user 1 (e.g., 0x6655) to target memory 108. Meanwhile, PDU handler 206 invalidates entry 3 of transaction table 116, as illustrated in final state 414 of transaction table 116.

In at least one embodiment, a method for handling data units in a multi-user system includes granting a shared resource to a user of a plurality of users for a transaction associated with an entry of a transaction data structure. The method includes determining whether the transaction stored last partial data of a data unit associated with the user in an alignment register associated with the user. The method includes asserting a request for arbitration of a plurality of transactions associated with the plurality of users. The request is asserted for an additional transaction associated with the entry in response to determining that the transaction stored the last partial data in the alignment register. The method may include flushing the last partial data from the alignment register to a target memory in response to detecting an additional grant of the shared resource to the user for the additional transaction. Flushing the last partial data may include resetting an indicator of the last partial data being stored in the alignment register, invalidating the entry, updating the alignment register associated with the user, and writing the last partial data to the target memory.

The method may include reading source memory and updating a source memory read pointer in response to detecting the grant of the shared resource to the user for the transaction in the absence of the last partial data of the data unit in the alignment register. The method may include, in response to an end attribute of the entry indicating the transaction is associated with an end of the data unit and in response to a condition precedent to triggering an additional write to the target memory being true based on a first width of the entry, a second width of partial data stored in the alignment register, and a third width of the target memory: setting an indication of the last partial data being stored in the alignment register, updating the alignment register, and writing penultimate partial data of the data unit to the target memory. The method may include, in response to an end attribute of the entry indicating the entry is associated with an end of the data unit and in response to a condition precedent to triggering an additional write to the target memory being false based on a first width of the entry, a second width of partial data stored in the alignment register, and a third width of the target memory: invalidating the entry, updating the alignment register, and writing last data of the data unit to the target memory. The method may include reading source memory and updating a source memory read pointer in response to detecting a second grant of the shared resource to the user for a second transaction associated with a second entry of the transaction data structure in the absence of the last partial data in the alignment register and in response to an end attribute of the second entry indicating the second transaction is not associated with an end of the data unit: invalidating the second entry. The method may include, in response to a condition precedent to a write to a target memory being false based on a first width of the second entry, a second width of partial data stored in the alignment register, and a third width of the target memory: updating the alignment register and writing partial data to the target memory. The method may include, in response to a condition precedent to a write to a target memory being true based on a first width of the second entry, a second width of partial data stored in the alignment register, and a third width of the target memory: updating the alignment register without writing the target memory.

In at least one embodiment, a multi-user system includes a source memory configured to store unaligned data units, a target memory configured to store aligned data units, merge and alignment logic for each of a plurality of users of the multi-user system, a transaction data structure configured to store entries corresponding to transactions associated with unaligned data units stored in the source memory, an arbiter control circuit responsive to a request for arbitration of transactions associated with valid entries in the transaction data structure to identify a winning transaction for access to the target memory, and a data unit end handler circuit for each of the plurality of users, the data unit end handler circuit being configured to assert a second request for arbitration in response to detecting last partial data of a data unit in the merge and alignment logic associated with a corresponding user of the plurality of users being associated with the winning transaction. The data unit end handler circuit may be configured to generate the request for arbitration based on a valid entry in the transaction data structure. For each of the plurality of users, the merge and alignment logic associated with the corresponding user may include an alignment register configured to store subblocks of a data unit read from the source memory, and an alignment counter indicating a width of subblocks of the data unit stored in the alignment register. For each of the plurality of users, the data unit end handler circuit may store an indicator of last partial data of the data unit being stored in the alignment register associated with the corresponding user.

The multi-user system may include a read pointer configured to store an address in the source memory indicating a location for a next read of the source memory, and read logic configured to enable a read of the source memory and a corresponding update of the read pointer based on an indicator of the last partial data being stored in the merge and alignment logic associated with a corresponding user. The multi-user system may include invalidation logic configured to invalidate the winning transaction based on an indicator of the last partial data being stored in the merge and alignment logic associated with a corresponding user. The multi-user system may include logic configured to write unaligned data units to the source memory and to write associated metadata in corresponding entries of the transaction data structure.

In at least one embodiment, a method for aligning data units in a multi-user system includes updating an indicator of an end of a data unit for a user based on a current state of the indicator of the end of the data unit for the user and an end attribute of an entry of a transaction data structure associated with a transaction. The updating is in response to the entry being valid and the transaction being granted access to a target memory. The updating may include setting the indicator of the end of the data unit for the user in response to the end attribute of the transaction indicating the end of the data unit and a condition precedent to triggering an additional write to the target memory being true based on a first width of data of the entry, contents of an alignment counter, and a second width of the target memory. The method may include after setting the indicator, providing a request for arbitration to an arbiter in response to detecting the entry of the transaction data structure is still valid. The updating may include resetting the indicator of the end of the data unit for the user after flushing last partial data of the data unit in response to the current state of the indicator of the end of the data unit for the user being set. The method may include updating an alignment register and an alignment counter associated with the user, and writing partial data associated with the transaction to the target memory.

Thus, techniques for data unit handling that process data units with integral and fractional data alignment without disrupting arbitration fairness have been disclosed. Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for handling data units in a multi-user system comprising:
    granting a shared resource to a user of a plurality of users for a transaction associated with an entry of a transaction data structure;
    determining whether the transaction stored last partial data of a data unit associated with the user in an alignment register associated with the user; and
    asserting a request for arbitration of a plurality of transactions associated with the plurality of users, the request being asserted for an additional transaction associated with the entry in response to determining that the transaction stored the last partial data in the alignment register.

2. The method, as recited in claim 1, further comprising:
    flushing the last partial data from the alignment register to a target memory in response to detecting an additional grant of the shared resource to the user for the additional transaction.

3. The method, as recited in claim 2, wherein flushing the last partial data comprises:
    resetting an indicator of the last partial data being stored in the alignment register;
    invalidating the entry;
    updating the alignment register associated with the user; and
    writing the last partial data to the target memory.

4. The method, as recited in claim 1, further comprising:
    reading source memory and updating a source memory read pointer in response to detecting the grant of the shared resource to the user for the transaction in the absence of the last partial data of the data unit in the alignment register.

5. The method, as recited in claim 4, further comprising:
    in response to an end attribute of the entry indicating the transaction is associated with an end of the data unit and in response to a condition precedent to triggering an additional write to the target memory being true based on a first width of the entry, a second width of partial data stored in the alignment register, and a third width of the target memory:
        setting an indication of the last partial data being stored in the alignment register;
        updating the alignment register; and
        writing penultimate partial data of the data unit to the target memory.

6. The method, as recited in claim 4, further comprising:
    in response to an end attribute of the entry indicating the entry is associated with an end of the data unit and in response to a condition precedent to triggering an additional write to the target memory being false based on a first width of the entry, a second width of partial data stored in the alignment register, and a third width of the target memory:
        invalidating the entry;
        updating the alignment register; and
        writing last data of the data unit to the target memory.

7. The method, as recited in claim 1, further comprising:
    reading source memory and updating a source memory read pointer in response to detecting a second grant of the shared resource to the user for a second transaction associated with a second entry of the transaction data structure in the absence of the last partial data in the alignment register and in response to an end attribute of the second entry indicating the second transaction is not associated with an end of the data unit:
        invalidating the second entry.

8. The method, as recited in claim 7, further comprising:
    in response to a condition precedent to a write to a target memory being false based on a first width of data of the second entry, a second width of partial data stored in the alignment register, and a third width of the target memory:
        updating the alignment register; and
        writing partial data to the target memory.

9. The method, as recited in claim 7, further comprising:
    in response to a condition precedent to a write to a target memory being true based on a first width of the second entry, a second width of partial data stored in the alignment register, and a third width of the target memory:
        updating the alignment register without writing the target memory.

10. A multi-user system comprising:
    a source memory configured to store unaligned data units;
    a target memory configured to store aligned data units;
    merge and alignment logic for each of a plurality of users of the multi-user system;

a transaction data structure configured to store entries corresponding to transactions associated with unaligned data units stored in the source memory;

an arbiter control circuit responsive to a request for arbitration of transactions associated with valid entries in the transaction data structure to identify a winning transaction for access to the target memory; and a data unit end handler circuit for each of the plurality of users, the data unit end handler circuit being configured to assert a second request for arbitration in response to detecting last partial data of a data unit in the merge and alignment logic associated with a corresponding user of the plurality of users being associated with the winning transaction.

11. The multi-user system, as recited in claim 10, wherein for each of the plurality of users, the merge and alignment logic associated with the corresponding user comprises:

an alignment register configured to store subblocks of the data unit read from the source memory; and an alignment counter indicating a width of subblocks of the data unit stored in the alignment register.

12. The multi-user system, as recited in claim 11, wherein for each of the plurality of users, the data unit end handler circuit stores an indicator of last partial data of the data unit being stored in the alignment register associated with the corresponding user.

13. The multi-user system, as recited in claim 10, further comprising:

a read pointer configured to store an address in the source memory indicating a location for a next read of the source memory; and read logic configured to enable a read of the source memory and a corresponding update of the read pointer based on an indicator of the last partial data being stored in the merge and alignment logic associated with a corresponding user.

14. The multi-user system, as recited in claim 10, further comprising:

invalidation logic configured to invalidate the winning transaction based on an indicator of the last partial data being stored in the merge and alignment logic associated with a corresponding user and a data unit end flag indicator of the winning transaction.

15. The multi-user system, as recited in claim 10, further comprising:

logic configured to write unaligned data units to the source memory and to write associated metadata in corresponding entries of the transaction data structure.

16. A method for aligning data units in a multi-user system comprising:

updating an indicator of an end of a data unit for a user based on a current state of the indicator of the end of the data unit for the user and an end attribute of an entry of a transaction data structure associated with a transaction, the updating being in response to the entry being valid and the transaction being granted access to a target memory.

17. The method, as recited in claim 16, wherein the updating comprises:

setting the indicator of the end of the data unit for the user in response to the end attribute of the transaction indicating the end of the data unit and a condition precedent to triggering an additional write to the target memory being true based on a first width of data of the entry, contents of an alignment counter, and a second width of the target memory.

18. The method, as recited in claim 17, further comprising:

after setting the indicator, providing a request for arbitration to an arbiter in response to detecting the entry of the transaction data structure is still valid.

19. The method, as recited in claim 16, wherein the updating comprises:

resetting the indicator of the end of the data unit for the user after flushing last partial data of the data unit in response to the current state of the indicator of the end of the data unit for the user being set.

20. The method, as recited in claim 16, further comprising:

updating an alignment register and an alignment counter associated with the user; and writing partial data associated with the transaction to the target memory.

* * * * *